(12) United States Patent
Chiang

(10) Patent No.: US 7,797,364 B2
(45) Date of Patent: Sep. 14, 2010

(54) BOOTH DECODER APPARATUS AND METHOD

(75) Inventor: Owen Chiang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1052 days.

(21) Appl. No.: 11/426,652

(22) Filed: Jun. 27, 2006

(65) Prior Publication Data

US 2007/0299900 A1 Dec. 27, 2007

(51) Int. Cl.
G06F 7/52 (2006.01)
(52) U.S. Cl. .................... 708/625; 708/620; 708/628
(58) Field of Classification Search .......... 708/625–631
See application file for complete search history.

(56) References Cited

U.S. PATENT DOCUMENTS

| | | | | | |
|---|---|---|---|---|---|
| 5,040,139 | A | * | 8/1991 | Tran | 708/628 |
| 5,231,415 | A | * | 7/1993 | Hagihara | 708/630 |
| 5,303,178 | A | * | 4/1994 | Ozaki | 708/632 |
| 5,442,576 | A | * | 8/1995 | Gergen et al. | 708/209 |
| 5,515,309 | A | * | 5/1996 | Fong | 708/631 |
| 5,748,517 | A | * | 5/1998 | Miyoshi et al. | 708/628 |
| 6,066,978 | A | * | 5/2000 | Kadowaki | 327/407 |
| 6,301,599 | B1 | * | 10/2001 | Chehrazi et al. | 708/628 |
| 7,069,290 | B2 | * | 6/2006 | Garrett et al. | 708/625 |
| 7,519,648 | B2 | * | 4/2009 | Rhee | 708/628 |
| 2008/0222227 | A1 | | 9/2008 | Chiang | |

OTHER PUBLICATIONS

R. W. Knepper, lecture slides, "CMOS Circuit and Logic Design", retrieved from http://people.bu.edu/rknepper/sc571/chapter5_ckts_A.ppt and http://web.archive.org/web/20040319175043/http://people.bu.edu/rknepper/sc571/chapter5_ckts_A.ppt, Mar. 19, 2004.*
"Booth's multiplication algorithm", Wikipedia, http://en.wikipedia.org/wiki/Booth's_multiplication_algorithm, 3 pages.

(Continued)

Primary Examiner—Chat C Do
Assistant Examiner—Matthew Sandifer
(74) Attorney, Agent, or Firm—Stephen R. Tkacs; Stephen J. Walder, Jr.; Matthew B. Talpis

(57) ABSTRACT

A Booth decoder may comprise three circuits that run in parallel. A first circuit is used to generate a shift control signal output. A second circuit is used to generate a zero control signal output. A third circuit is used to generate an invert control signal output. The first and second circuits receive the three-bit block as an input and generate their respective outputs based on the setting of each of the bits. The third circuit receives only the most significant bit of the three-bit block as its input and generates an invert signal output based on the setting of the most significant bit. In each of these circuits, the number of complex gates and transistors is minimized thereby reducing gate delay and power consumption in generating the control signals for performing a Booth multiplication operation.

14 Claims, 8 Drawing Sheets

OTHER PUBLICATIONS

"Booth Recoding", ASIC Design for Signal Processing, http://www.geoffknagge.com/fyp/booth.shtml, 5 pages.

USPTO U.S. Appl. No. 12/127,064, Image File Wrapper printed Mar. 25, 2010, 2 pages.

Cho, Ki-Seon et al., "54×54-bit Radix-4 Multiplier based on Modified Booth Algorithm", Proceedings of the 13th ACM Great Lakes Symposium on VLSI, Apr. 2003, pp. 233-236.

Lakshmanan, Masuri O. et al., "High Performance Parallel Multiplier using Wallace-Booth Algorithm", IEEE International Conference on Semiconductor Electronics, Proceedings, Dec. 2002, pp. 433-436.

Tan, Dimitri et al., "Multiple-Precision Fixed-Point Vector Multiply-Accumulator using Shared Segmentation", 16th IEEE Symposium on Computer Artihmetic, 2003. Proceedings., Jun. 2003, pp. 12-19.

Notice of Allowance mailed May 13, 2010 for U.S. Appl. No. 12/127,064, 24 pages.

Response to Office Action filed Apr. 5, 2010 for USPTO U.S. Appl. No. 12/127,064, 19 pages.

* cited by examiner

| MULTIPLIER 3-BIT BLOCK | PARTIAL PRODUCT | BOOTH DECODER OUTPUT SIGNAL ||||| 
|---|---|---|---|---|---|---|
| | | 0 TERM | +1B TERM | +2B TERM | -2B TERM | -1B TERM |
| 000 | 0   | 1 | 0 | 0 | 0 | 0 |
| 001 | +1B | 0 | 1 | 0 | 0 | 0 |
| 010 | +1B | 0 | 1 | 0 | 0 | 0 |
| 011 | +2B | 0 | 0 | 1 | 0 | 0 |
| 100 | -2B | 0 | 0 | 0 | 1 | 0 |
| 101 | -1B | 0 | 0 | 0 | 0 | 1 |
| 110 | -1B | 0 | 0 | 0 | 0 | 1 |
| 111 | 0   | 1 | 0 | 0 | 0 | 0 |

BOOTH DECODER APPARATUS AND METHOD

BACKGROUND

1. Technical Field

The present application relates generally to an improved Booth decoder apparatus and method. More specifically, the present application is directed to a Booth decoder circuit that minimizes the delay elements of the Booth decoder circuit thereby increasing the speed of the Booth decoder circuit operation.

2. Description of Related Art

In 1951, Andrew D. Booth, while doing research on crystallography at Birkbeck College in Bloomsbury, London invented an algorithm for performing multiplication of two signed numbers in two's complement notation. Booth used desk calculators that were faster at shifting than adding and created the algorithm to increase their speed.

Booth's multiplication algorithm may be described as follows. If x is the count of bits of the multiplicand, i.e. a quantity that is multiplied by another quantity (the multiplier), and y is the count of bits of the multiplier:

(1) Draw a grid of three lines, each with squares for x+y+1 bits. Label the lines respectively A (add), S (subtract), and P (product);

(2) In two's complement notation, fill the first x bits of each line with:
  A: the multiplicand
  S: the negative of the multiplicand
  P: zeros (3) Fill the next y bits of each line with:
  A: zeros
  S: zeros
  P: the multiplier (4) Fill the last bit of each line with a zero.

(5) Do the following two steps |y| (Absolute value of y) times:
  a) If the last two bits in the product are:
    00 or 11: do nothing
    01: P=P+A. Ignore any overflow.
    10: P=P+S. Ignore any overflow.
  b) Arithmetically shift the product right one position.

(6) Drop the last bit from the product for the final result.

The following is an example of the implementation of Booth's multiplication algorithm. Assume that one wants to find the result of 3×−4, where 3 is the multiplicand and −4 is the multiplier. Performing steps 1-4 of the Booth multiplication algorithm, the result achieved is as follows:

```
A = 0011 0000 0
S = 1101 0000 0
P = 0000 1100 0
```

Performing the fifth step of Booth's algorithm requires four iterations through the loop as follows:

```
P = 0000 1100 0. The last two bits are 00.
P = 0000 0110 0. A right shift.
*end of first iteration*
P = 0000 0110 0. The last two bits are 00.
P = 0000 0011 0. A right shift.
*end of second iteration*
P = 0000 0011 0. The last two bits are 10.
P = 1101 0011 0. P = P + S.
P = 1110 1001 1. A right shift.
*end of third iteration*
P = 1110 1001 1. The last two bits are 11.
P = 1111 0100 1. A right shift.
```

Thus, the product of 3×−4 is 1111 0100, which is equal to −12.

In order to understand why Booth's multiplication algorithm works, consider a positive multiplier consisting of a block of is surrounded by 0s, e.g., 00111110. The product is given by:

$$M \times \text{``00111110''} = M \times (2^5 + 2^4 + 2^3 + 2^2 + 2^1) = M \times 62$$

where M is the multiplicand. The number of operations can be reduced to two by rewriting the same product as:

$$M \times \text{``010000-10''} = M \times (2^6 - 2^1) = M \times 62$$

The product can be then generated by one addition and one subtraction of the multiplicand. This scheme can be extended to any number of blocks of is in a multiplier, including the case of a single 1 in a block.

Thus, Booth's multiplication algorithm follows this scheme by performing an addition when it encounters the first digit of a block of ones (01) and a subtraction when it encounters the end of the block of ones (10). This works for a negative multiplier as well. When the ones in a multiplier are grouped into long blocks, Booth's algorithm performs fewer additions and subtractions than a normal multiplication algorithm.

With regard to computer architecture, the Booth multiplication algorithm is a technique that allows for smaller, faster multiplication circuits in computing devices, by recoding the numbers that are multiplied. It is the standard technique used in chip design, and provides significant improvements over the "long multiplication" technique.

The standard "long multiplication" technique involves performing, for each column in the multiplier, a shift of the multiplicand by an appropriate number of columns and multiplying it by a value of the digit in that column of the multiplier to obtain a partial product. The partial products may then be added to obtain the final result. With such a system, the number of partial products is exactly the number of columns in the multiplier.

The number of partial products may be reduced by half by using a technique known as radix 4 Booth recoding. The basic idea is that instead of shifting and adding for every column of the multiplier term and multiplying by 1 or 0, every second column is taken and multiplied by ±1, ±2, or 0 to obtain the same results. Thus, to multiply by 7, one can multiply the partial product aligned against the least significant bit by −1, and multiply the partial product aligned with the third column by 2:

Partial Product 0=Multiplicand*−1, shifted left 0 bits (x −1).

Partial Product 1=Multiplicand*2, shifted left 2 bits (x 8).

This is the same result as the equivalent shift and add method as shown below:

Partial Product 0=Multiplicand*1, shifted left 0 bits (x 1).

Partial Product 1=Multiplicand*1, shifted left 1 bit (x 2).

Partial Product 2=Multiplicand*1, shifted left 2 bits (x 4).

Partial Product 3=Multiplicand*0, shifted left 3 bits (x 0).

The halving of the number of partial products is important in circuit design as it relates to the propagation delay in the running of the circuit as well as the complexity and power consumption of the circuits.

Moreover, it is also important to note that there is comparatively little complexity penalty in multiplying by 0, 1 or 2. All that is needed is a multiplexer, or the equivalent, which has a delay time that is independent of the size of the inputs. Negating 2's complement numbers has the added complication of needing to add a "1" to the least significant bit, but this can be overcome by adding a single correction term with the necessary "1"s in the correct positions.

To Booth recode the multiplier term, the bits of the multiplier term are considered in blocks of three such that each block overlaps the previous block by one bit, as shown in FIG. 1A. Grouping of bits starts from the least significant bit with the first block 105 only using two bits of the multiplier, since there is no previous block to overlap. The overlap of the blocks 105-145 is necessary so that it can be known what happened in the last block, as the most significant bit of the block acts like a sign bit. Since the least significant bit of each block is used to know what the sign bit was in the previous block, and there are never any negative products before the least significant block, the least significant bit of the first block 105 is always assumed to be 0.

After having grouped the bits into three-bit blocks, the Booth decoder truth table shown in FIG. 1B is then consulted to determine what the encoding will be for each block. In the Booth decoder truth table of FIG. 1B, the multiplicand is B and the multiplier is A (thus, the truth table is for multiplication of B*A). For each iteration of Booth recoding, the three-bit blocks of the multiplier are used to generate a partial product. For example, when the three-bit block is "010", the partial product is +1B, i.e. +1*Multiplicand, as shown in the second column of FIG. 1B. Each of the three-bit blocks of the multiplier are used to generate partial products which are then added to obtain the resulting value of the multiplication operation.

FIG. 2 illustrates a known multiplier circuit arrangement for realizing Booth's multiplication algorithm and which utilizes the three-bit blocks and truth table described above. This multiplier circuit is described in U.S. Pat. No. 5,748,517, which is hereby incorporated by reference.

As shown in FIG. 2, Booth decoders BD1-BD3 receive overlapping three bits of a 6-bit multiplier Y (Y0-Y5), respectively. That is to say, the Booth decoder BD1 receives "0", Y0, Y1, the Booth decoder BD2 receives Y1, Y2, Y3, and the Booth decoder BD3 receives Y3, Y4, Y5. The Booth decoders BD1-BD3 output partial product information groups S1-S5 to partial product generating circuits PP1-PP3 on the basis of the received three bits of the multiplier Y, respectively.

The partial product generating circuits PP1-PP3 receive the partial product information groups S1-S5 from the Booth decoders BD1-BD3, respectively, and an 8-bit multiplicand X (X0-X7). The partial product generating circuits PP1-PP3 output partial products SM1-SM3 to a partial product adder circuit ADD1. The partial product adder circuit ADD1 adds SM1-SM3 to output a multiplication result XY of the multiplier Y and the multiplicand X.

FIG. 3 is a circuit diagram showing the internal configuration of the Booth decoders BD1-BD3 of the multiplication circuit shown in FIG. 2. As shown in FIG. 3, the least significant multiplier $Y_{2i-1}$ corresponds to 0, Y1, Y3 of the Booth decoders BD1-BD3, the intermediate multiplier $Y_{2i}$ corresponds to Y0, Y2, Y4 of the Booth decoders BD1-BD3, and the most significant multiplier $Y_{2i+1}$ corresponds to Y1, Y3, Y5 of the Booth decoders BD1-BD3.

An AND gate 50 receives the least significant multiplier $Y_{2i-1}$, the intermediate multiplier $Y_{2i}$ and the most significant multiplier $Y_{2i+1}$ as inputs and provides a result of the logic operation as an output to an OR gate 51. A NOR gate 52 receives the least significant multiplier $Y_{2i-1}$, the intermediate multiplier $Y_{2i}$ and the most significant multiplier $Y_{2i+1}$ as inputs and outputs a result of the logic operation to the OR gate 51. The output of the OR gate 51 becomes the partial product information S1.

A NOR gate 53 receives the least significant multiplier $Y_{2i-1}$ and the intermediate multiplier $Y_{2i}$ and outputs a result of the logic operation to a NAND gate 54. A NAND gate 56 receives the least significant multiplier $Y_{2i-1}$ and the intermediate multiplier $Y_{2i}$ and outputs a result of the logic operation to a NOR gate 57. The NAND gate 54 further receives the most significant multiplier $Y_{2i+1}$ and outputs a result of the logic operation as an inversion partial product information S2, and also outputs the partial product information S2 through an inverter 55. The NOR gate 57 further receives the most significant multiplier $Y_{2i+1}$ and outputs a result of the logic operation as the partial product information S3, and also outputs the inversion partial product information S3 through an inverter 58.

An XOR gate 61 receives the least significant multiplier $Y_{2i-1}$ and the intermediate multiplier $Y_{2i}$ and outputs a result of the logic operation to a NAND gate 59 and a NAND gate 63. The NAND gate 59 further receives the most significant multiplier $Y_{2i+1}$ and outputs a result of the logic operation as the inversion partial product information S4, and also outputs the partial product information S4 through an inverter 60. The NAND gate 63 further receives the intermediate multiplier $Y_{2i}$ through an inverter 62 and outputs a result of the logic operation as the inversion partial product information S5 and also outputs the partial product information S5 through an inverter 64.

In this common static circuit design shown in FIG. 3, the Booth decoder circuitry is relatively large, requiring a large number of transistors, and slow operating. It would be beneficial to be able to reduce the size of the Booth decoder circuitry and increase the speed at which it operates.

SUMMARY

In one illustrative embodiment, an apparatus is provided that comprises a shift control signal generation circuit that receives a three-bit block of a multiplier as input and generates a shift control signal, a zero control signal generation circuit that receives the three-bit block of the multiplier as input and generates a zero control signal, and an invert control signal generation circuit that receives a most significant bit of the three-bit block of the multiplier as input and generates an invert control signal. The shift control signal, zero control signal, and invert control signal may be output by the apparatus for controlling generation of a partial product of a Booth multiplication operation.

The apparatus may further comprise a multiplexer coupled to the shift control signal generation circuit, the zero control signal generation circuit, and the invert control signal generation circuit. The multiplexer may receive the shift control signal, the zero control signal, and invert control signal and may generate the partial product of the Booth multiplication operation.

The shift control signal generation circuit may generate a logic "1" shift control signal when the three-bit block is either "011" or "100." The zero control signal generation circuit may generate a logic "1" zero control signal when the three-bit block is either "000" or "111." The invert control signal generation circuit may generate a logic "1" invert control signal when the most significant bit of the three-bit block is a logic "1.

The shift control signal generation circuit and the zero control signal generation circuit may each comprise a plurality of inverters and a plurality of switches coupled to respective ones of the plurality of inverters. The shift control signal generation circuit and the zero control signal generation circuit may each comprise a set of transistors. Respective ones of the transistors may be coupled to outputs of respective ones of the plurality of inverters and the plurality of switches.

With regard to each of the shift control signal generation circuit and the zero control signal generation circuit, a first switch of the plurality of switches may be opened and closed based on a first input signal corresponding to a least significant bit of the three-bit block, and a second switch of the plurality of switches may be opened and closed based on a second input signal corresponding to a middle bit of the three-bit block. A third switch of the plurality of switches may be opened and closed based on a third input signal corresponding to an inverted middle bit of the three-bit block, and a fourth switch of the plurality of switches may be opened and closed based on a fourth input signal corresponding to an inverted least significant bit of the three-bit block.

With regard to the shift control signal generation circuit, the first switch may receive an input signal corresponding to an inverted most significant bit of the three-bit block, the third switch may receive an input signal corresponding to the most significant bit of the three-bit block, the second switch may receive an output from the first switch, and the fourth switch may receive an output from the third switch. With regard to the zero control signal generation circuit, the first switch may receive an input signal corresponding to the most significant bit of the three-bit block, the third switch may receive an input signal corresponding to an inverted most significant bit of the three-bit block, the second switch may receive an output from the first switch, and the fourth switch may receive an output from the third switch.

With regard to the shift control signal generation circuit, a first transistor of the set of transistors may receive an input signal corresponding to an inverted least significant bit of the three-bit block, a second transistor of the set of transistors may receive an input signal corresponding to an inverted middle bit of the three-bit block, a third transistor of the set of transistors may receive an input signal corresponding to the middle bit of the three-bit block, and a fourth transistor of the set of transistors may receive an input signal corresponding to the least significant bit of the three-bit block. The first transistor may be in series with the third transistor, the second transistor may be in series with the fourth transistor, the first transistor may be parallel to the second transistor, and the third transistor may be parallel to the fourth transistor.

In yet another illustrative embodiment, a method of providing a Booth decoder circuit is provided. The method may comprise providing a shift control signal generation circuit that receives a three-bit block of a multiplier as input and generates a shift control signal, providing a zero control signal generation circuit that receives the three-bit block of the multiplier as input and generates a zero control signal, and providing an invert control signal generation circuit that receives a most significant bit of the three-bit block of the multiplier as input and generates an invert control signal. The shift control signal, zero control signal, and invert control signal may be output by the Booth decoder circuit for controlling generation of a partial product of a Booth multiplication operation.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figures 1A, 1B:
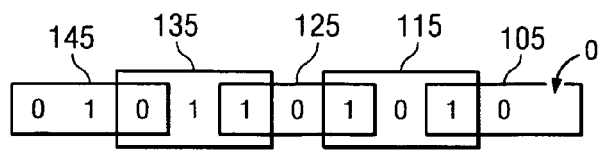
FIG. 1A is an exemplary diagram illustrating overlapping three-bit blocks of a multiplier in accordance with a known Booth decoder methodology.
FIG. 1B is an exemplary diagram of a partial product truth table for a Booth decoder in accordance with a known methodology.
Figure 2:
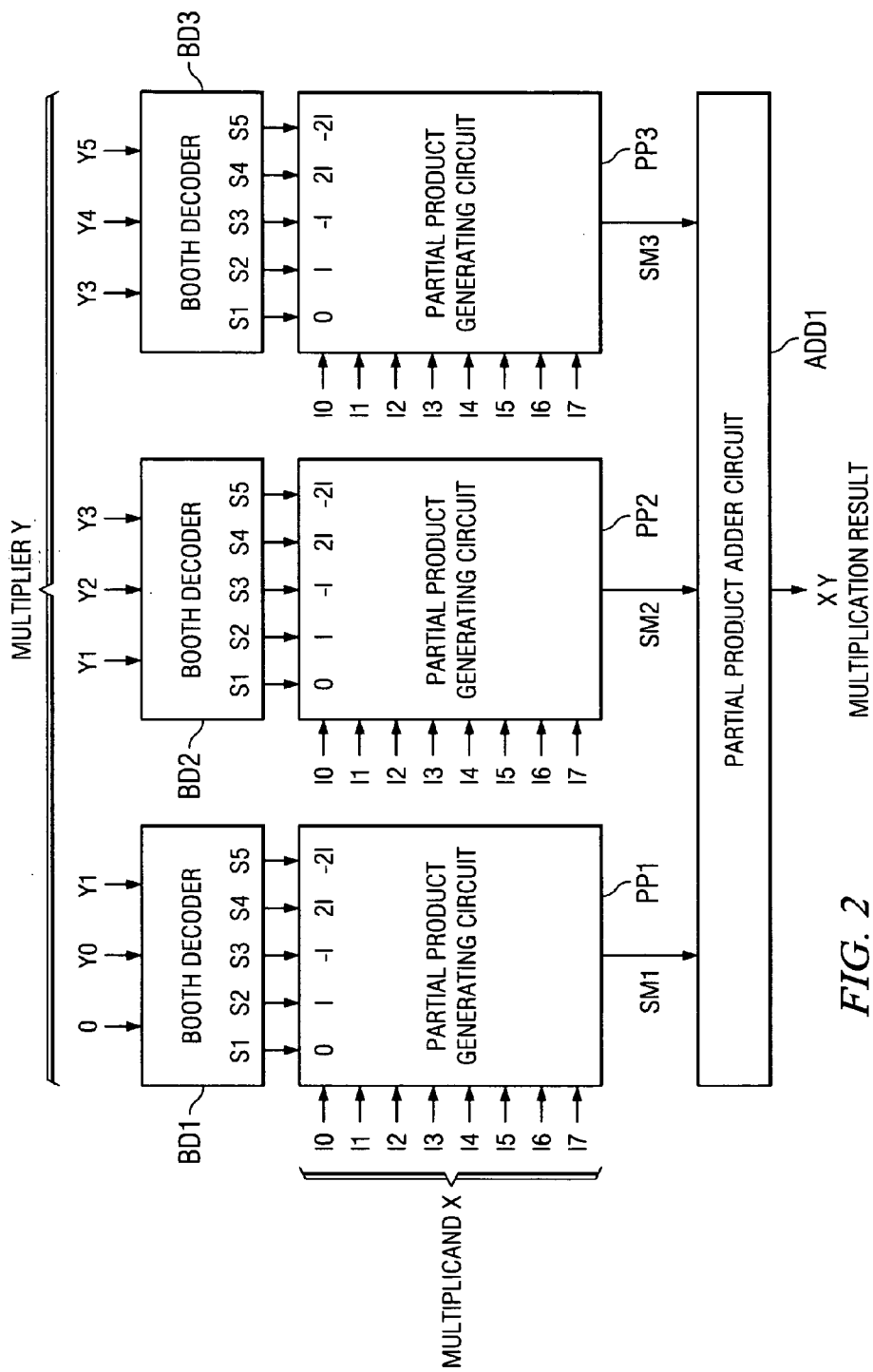
FIG. 2 is an exemplary diagram of a multiplier circuit in accordance with a known mechanism.
Figure 3:
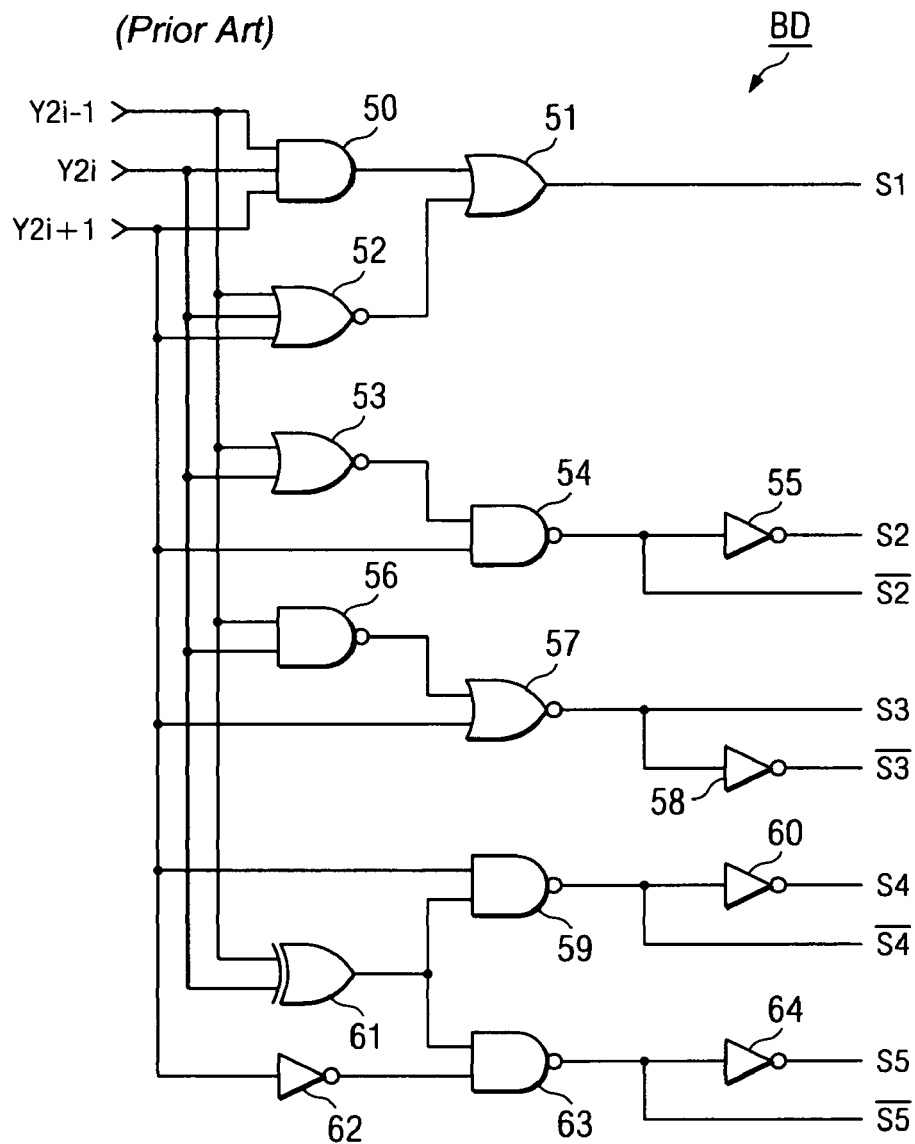
FIG. 3 is an exemplary diagram of Booth decoder circuitry in accordance with a known mechanism.

As stated above, the illustrative embodiments provide a Booth decoder circuit that reduces the size and gate delay of the Booth decoder circuit when compared to known mechanisms. For example, in one illustrative embodiment, only one complex transmission gate is required to generate each control signal, i.e. shift, zero, and invert. This greatly reduces the delay when compared to the prior art Booth decoder mechanisms such as shown in FIGS. 2 and 3.

Figures 4A, 4B:
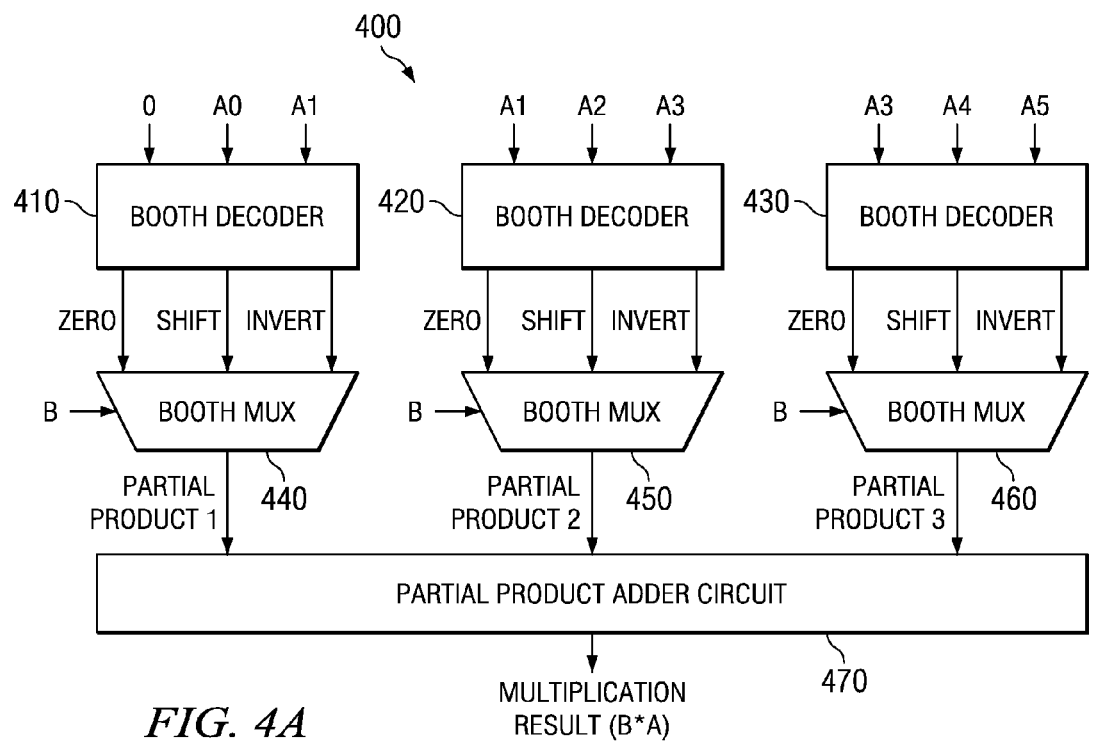
FIG. 4A is an exemplary diagram illustrating a multiplier circuit in accordance with one illustrative embodiment.
FIG. 4B is a partial product truth table for the Booth decoders of the illustrative embodiments.

FIG. 4A is an exemplary diagram illustrating a multiplier circuit in accordance with an illustrative embodiment. As shown in FIG. 4A, a plurality of Booth decoders 410-430 are provided that receive as inputs, the overlapping three-bit blocks of the multiplier A. For a 6-bit multiplier value, these bits are labeled as A0, A1, A2, A3, A4 and A5 with an initial 0 bit being provided since the first three-bit block does not overlap a previous three-bit block in the multiplier.

The Booth decoders 410-430 operate on their respective three-bit blocks to each generate a shift control signal output (shift), zero control signal output (zero), and invert control signal output (invert). These control signals are input to respective Booth multiplexers 440-460. The Booth multiplexers 440-460 operate on these control signals to generate partial products which are output to the partial product adder circuit 470. The partial product adder circuit 470 adds the partial products, in a manner generally known in the art, to thereby obtain the multiplication result.

The Booth decoders 410-430 operate on the three-bit blocks in such a manner as to obtain the shift, zero, and invert control signals in accordance with the partial product truth table illustrated in FIG. 4B. As shown in FIG. 4B, the zero control signal is high, i.e. a logical "1," only when the three-bit block is "000" or "111." With all other three-bit block combinations, the zero control signal is low, i.e. a logical "0." The shift control signal is high only when the three-bit block is "011" or "100" and is low for all other three-bit block combinations. The invert control signal is high when the three-bit block is "100," "101," "110," or "111." For all other three-bit block combinations, the invert control signal is low.

The zero signal indicates whether the multiplicand is zeroed before being used as a partial product. The shift signal is used as the control to a 2-way multiplexer in the Booth multiplexer 440-460 to thereby select whether or not the partial product bits are shifted left one position, i.e. doubled. Finally, the invert signal indicates whether or not to invert all of the bits of the partial product to create a negative partial product (which must be corrected by adding "1" at some later stage). The invert signal may be provided to another 2-way multiplexer in the Booth multiplexer 440-460, which may be implemented as an XOR gate, for example.

Based on the three-bit block input to the Booth decoders 410-430, the Booth decoders 410-430 generate the shift, zero, and invert control signals which are input to corresponding Booth multiplexers 440-460. The Booth multiplexers 440-460 operate on these control signal inputs in accordance with the partial product truth table shown in FIG. 4B to generate the partial products. Thus, for example, if the zero control signal is high and the shift and invert control signals are low, i.e. 100, or if the zero and invert control signals are high and the shift control signal is low, then the partial product is 0. If all three control signals are low, then the partial product is +1B (i.e. 1*multiplicand), where B is the multiplicand and A is the multiplier (i.e. B*A).

If the zero control signal is low, the shift control signal is high, and the invert control signal is low, then the partial product is +2B (i.e. 2*multiplicand). If the zero control signal is low, the shift control signal is high, and the invert control signal is high, then the partial product is −2B (i.e. −2*multiplicand). If both the zero and shift control signals are low and the invert control signal is high, then the partial product is −1B (i.e. −1*multiplicand).

These partial products that are generated by the Booth multiplexers 440-460 are output to a partial product adder circuit 470. The partial product adder circuit 470 adds these partial products together to obtain the multiplication result in accordance with Booth's multiplication algorithm. In one illustrative embodiment, the partial product adder circuit 470 is the same partial product adder circuit as described in U.S. Pat. No. 5,748,517. Of course, other partial product adder circuits that may combine partial products of the Booth multiplication algorithm to generate a multiplication result may be used without departing from the spirit and scope of the present invention.

In the illustrative embodiments, the Booth decoder circuits 410-430 each comprise three circuits that run in parallel. A first circuit is used to generate the shift control signal output. A second circuit is used to generate the zero control signal output. A third circuit is used to generate the invert control signal output. The first and second circuits receive the three-bit block as an input and generate their respective outputs, i.e. shift and zero control signals, based on the setting of each of the bits, e.g., "0" or "1." The third circuit receives only the most significant bit of the three-bit block as its input and generates the invert signal output based on the setting of the most significant bit, e.g., "0" or "1."

The three circuits are configured so as to implement logical equations for the three control signals. That is, the three control signals, i.e. zero, shift, and invert, may be described using the following logic equations:

$$zero = A2 * A1 * A0 + A2\_b * A1\_b * A0\_b$$

$$shift = A2\_b * A1 * A0 + A2 * A1\_b * A0\_b$$

$$invert = A2$$

where A2, A1, and A0 are the three bits of the three-bit block (A2A1A0) input to the Booth decoder 410-430, A0 being the least significant bit and A2 being the most significant bit. A2_b, A1_b, and A0_b, are the inverted A2, A1, and A0 values. Thus, if A2 is "1" then A2_b is "0."

In one illustrative embodiment, the three circuits are configured to include NAND gates such that only approximately 4 to 6 gate delay is experienced when generating control signals. In an alternative embodiment, the three circuits are configured to utilize switches and a set of transistors such that only approximately 1 to 2 gate delay is experienced when generating the control signals.

Thus, the three circuits of the illustrative embodiment may increase the speed of the Booth decoder circuits by reducing the delay when compared to known Booth decoder circuits, such as illustrated in FIGS. 2 and 3. Moreover, the three circuits of the illustrative embodiments may reduce the number of complex gate elements needed to perform the Booth decoding thereby reducing the size of the Booth decoder circuit. This reduction in size and complexity results in increased available area on the chip on which the Booth decoder circuit is utilized as well as reduces the power consumed by the Booth decoder circuit.

The three circuits that make up the Booth decoder of the illustrative embodiments will now be described in detail with regard to two alternative embodiments illustrated in FIGS. 5-10. It should be appreciated that while these circuits are depicted in separate figures, they may be integrated with one another and are intended to operate in parallel.

Figure 5:
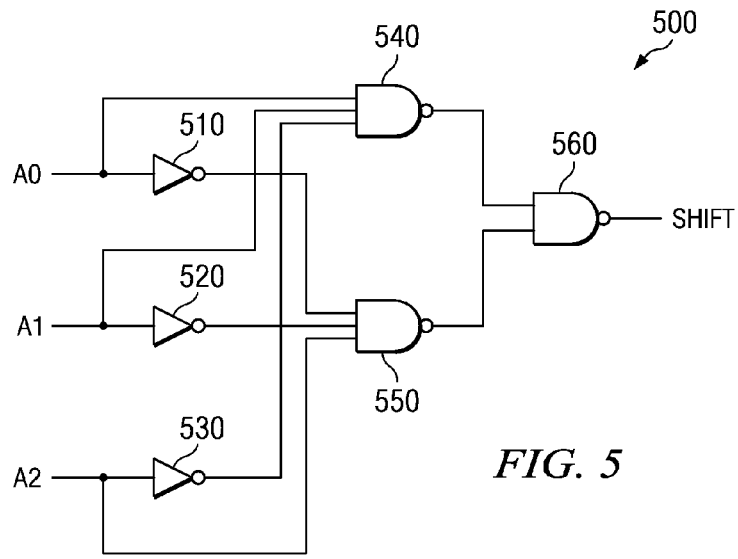
FIG. 5 is an exemplary circuit diagram of a first circuit of a Booth decoder for generating a shift control signal output in accordance with a first illustrative embodiment.

FIG. 5 is an exemplary circuit diagram of a first circuit of a Booth decoder for generating a shift control signal output in accordance with a first illustrative embodiment. As shown in FIG. 5, the circuit 500 receives the three-bit block inputs A0, A1 and A2 and provides each of these inputs to a respective NAND gate 540 or 550 and an inverter, 510, 520, or 530. The non-inverted input signal from a bit of the three-bit block input is provided to a first one of the NAND gates 540 and 550 with the inverted input signal, output by one of the respective inverters 510, 520 and 530, being provided to the other of the NAND gates 540 and 550.

For example, the A0 input signal is provided to NAND gate 540, and the inverted A0 input signal is provided to NAND gate 550. Similarly, the A1 input signal is provided to the NAND gate 540, and the inverted A1 input signal is provided to NAND gate 550. However, the A2 input signal is provided to the NAND gate 550, and the inverted A2 input signal is provided to the NAND gate 540.

As is generally known, a NAND gate, or "Not-AND" gate, has a high output when the inputs to the NAND gate are not all high and a low output when the inputs are all high. Thus, the output of NAND gate 540 is low when A0, A1, and the inverted A2 input signal are all high, i.e. when the three-bit block inputs A2A1A0 are "011." Similarly, the output of NAND gate 550 is low when the inverted A0 and A1 signals and the non-inverted A2 signal are all high, i.e. when the three-bit block inputs A2A1A0 are "100." For all other combinations of bits in the three-bit block, the outputs of these NAND gates 540 and 550 will be high.

The outputs from the NAND gates 540 and 550 are provided to a third NAND gate 560. The third NAND gate 560 outputs a low shift control signal when the two outputs of the NAND gates 540 and 550 are high and outputs a high shift control signal when at least one of the two outputs of the NAND gates 540 and 550 is low. Thus, when the three-bit block inputs A2A1A0 are "011" or "100," the NAND gate 560 will output a high shift control signal. For all other combinations of bits in the three-bit block, the NAND gate 560 will output a low shift control signal since the output from the NAND gates 540 and 550 will both be high.

Figure 6:
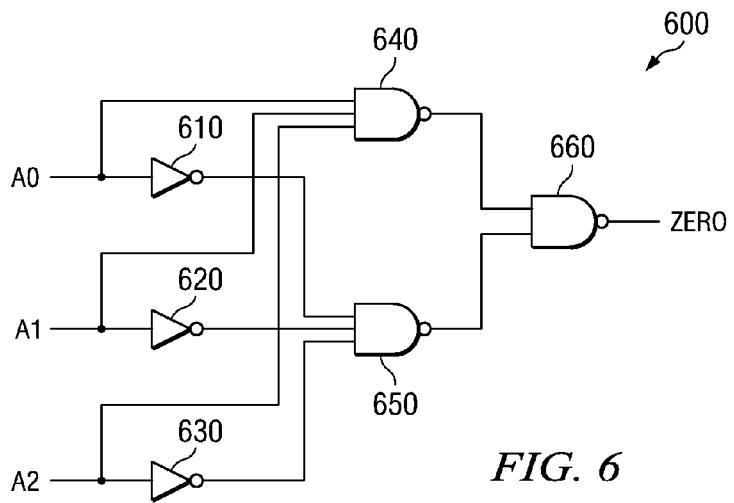
FIG. 6 is an exemplary circuit diagram of a second circuit of a Booth decoder for generating a zero control signal output in accordance with the first illustrative embodiment.

FIG. 6 is an exemplary circuit diagram of a second circuit of a Booth decoder for generating a zero control signal output in accordance with the first illustrative embodiment. As shown in FIG. 6, the circuit 600 receives the three-bit block inputs A0, A1 and A2 and provides each of these inputs to a respective NAND gate 640 or 650 and an inverter, 610, 620, or 630. The non-inverted input signal from a bit of the three-bit block input is provided to a first one of the NAND gates 640 and 650 with the inverted input signal, output by one of the respective inverters 610, 620 and 630, being provided to the other of the NAND gates 640 and 650.

For example, the A0 input signal is provided to NAND gate 640, and the inverted A0 input signal is provided to NAND gate 650. Similarly, the A1 input signal is provided to the NAND gate 640, and the inverted A1 input signal is provided to NAND gate 650. However, the A2 input signal is provided to the NAND gate 640, and the inverted A2 input signal is provided to the NAND gate 650.

The output of NAND gate 640 is low when the A0, A1, and A2 input signals are all high, i.e. when the three-bit block inputs A2A1A0 are "111." Similarly, the output of NAND gate 650 is low when the inverted A0, A1 and A2 signals are all high, i.e. when the three-bit block inputs A2A1A0 are "000." For all other combinations of bits in the three-bit block, the outputs of these NAND gates 640 and 650 will be high.

The outputs from the NAND gates 640 and 650 are provided to a third NAND gate 660. The third NAND gate 660 outputs a low shift control signal when the two outputs of the NAND gates 640 and 650 are high and outputs a high shift control signal when at least one of the two outputs of the NAND gates 640 and 650 is low. Thus, when the three-bit block inputs A2A1A0 are "111" or "000," the NAND gate 660 will output a high shift control signal. For all other combinations of bits in the three-bit block, the NAND gate 660 will output a low shift control signal since the output from the NAND gates 640 and 650 will both be high.

Figure 7:
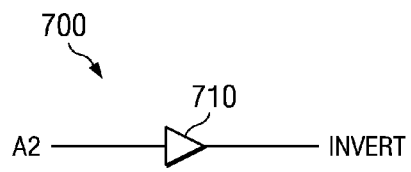
FIG. 7 is an exemplary circuit diagram of a third circuit of a Booth decoder for generating a zero control signal output in accordance with the first illustrative embodiment.

FIG. 7 is an exemplary circuit diagram of a third circuit of a Booth decoder for generating a zero control signal output in accordance with the first illustrative embodiment. This third circuit is an invert control signal generation circuit 700 that is comprised of a wire and an amplifier 710. The invert control signal generation circuit 700 receives the A2 signal as an input and passes the A2 signal as the invert control signal. Thus, if the A2 signal is high (logic "1") then the invert control signal is high. If the A2 signal is low (logic "0") then the invert control signal is low.

The combination of these three circuits 500, 600, and 700 provides all of the possible combinations of shift, zero, and invert control signals required to provide the necessary partial products set forth in the partial product truth table of FIG. 4B. The outputs from these three circuits, i.e. the shift, zero, and invert control signals, are provided to a Booth multiplexer which uses these signals to generate a partial product.

FIGS. 8-11 are exemplary circuit diagrams of shift, invert, and zero control signal generation circuits of a Booth decoder in accordance with an alternative illustrative embodiment. This alternative illustrative embodiment achieves the same result as the circuitry of the illustrative embodiment described above with regard to FIGS. 5-7 but with reduced size and gate delay. The reduction in size and gate delay is achieved through use of switches and a set of transistors in place of the NAND gates described in the previous illustrative embodiment.

Figure 8:
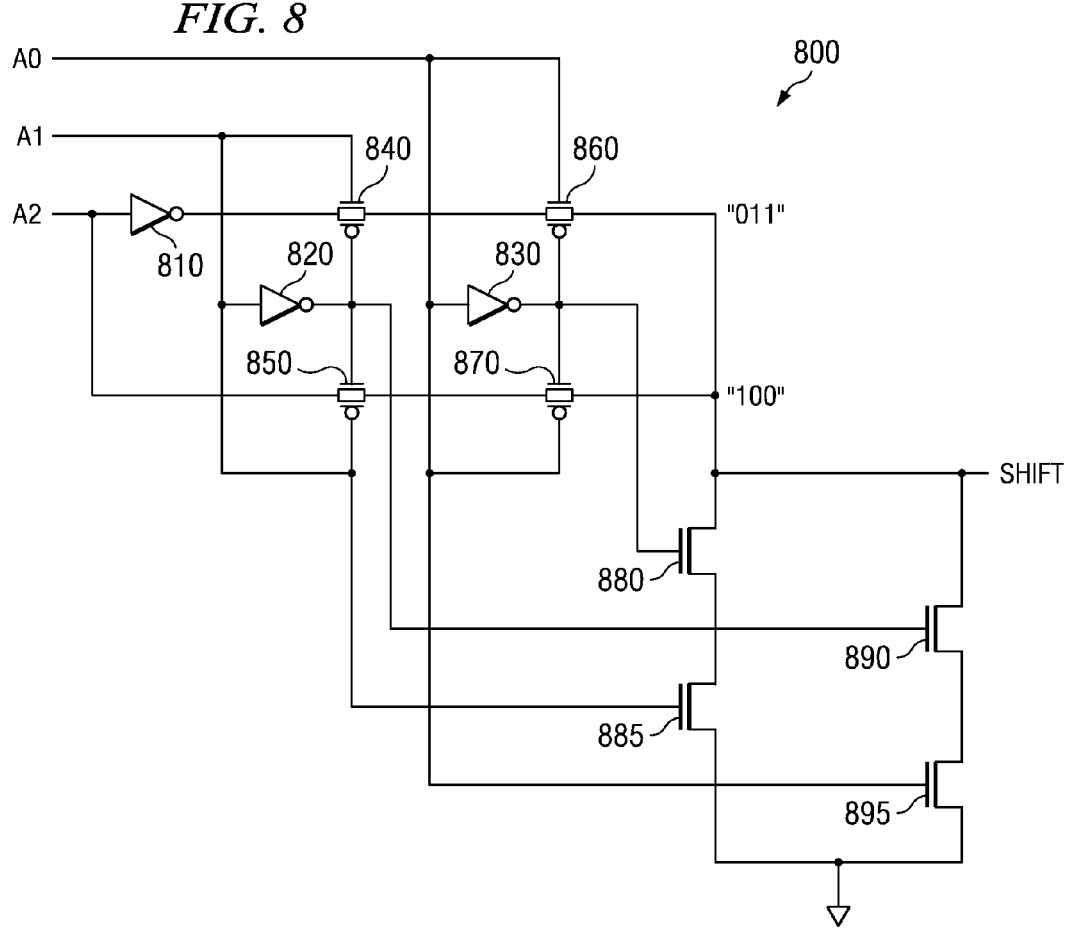
FIG. 8 is an exemplary circuit diagram of a first circuit of a Booth decoder for generating a shift control signal output in accordance with an alternative illustrative embodiment.

FIG. 8 is an exemplary circuit diagram of a first circuit of a Booth decoder for generating a shift control signal output in accordance with an alternative illustrative embodiment. As shown in FIG. 8, signals corresponding to the three-bit block, in this case bits A0, A1, and A2, are input to the shift control signal generation circuit 800. The shift control signal generation circuit 800 includes a set of inverters 810-830, a set of switches 840-870, and a set of transistors 880-895. The input signals are provided to both the set of inverters 810-830 and the set of switches 840-870. The signals associated with the least significant bit (A0) and middle bit (A1) of the three-bit block are further provided to the set of transistors 880-895 as well as the inverted signals associated with the least significant bit and middle bit of the three-bit block. An output, i.e. the "shift" control signal, is generated by the shift control signal generation circuit 800 based on the setting of the switches 840-870 and the transistors 880-895. The switches 840-870 and transistors 880-895 are configured such that if the input three-bit block is "011" or "100," then the output signal, i.e. the shift control signal, is asserted, i.e. is driven high (logic "1"). For all other combinations of bits in the three-bit block, the transistors 880-895 drive the shift control signal low (logic "0") such that the shift control signal is not asserted.

As shown in FIG. 8, the input signal associated with the most significant bit (A2) is provided to a first inverter 810 which inverts the input signal and provides the inverted output to a first switch 840. The A2 input signal is further provided to a second switch 850. The first switch 840 is turned on or off based on the state of the input signal corresponding to the second bit (A1) of the three-bit block. If the first switch 840 is turned on by the second bit (A1) being high (logic "1") then the inverted A2 signal is provided to a third switch 860. Otherwise, if the first switch 540 is turned off by the second bit (A1) being low (logic "0") then the inverted A2 signal is not transmitted to the third switch 860.

The third switch 860 is turned on or off based on the state of the input signal corresponding to the first bit (A0) of the three-bit block. If the A0 input signal is high (logic "1"), then the third switch 860 is turned on and the inverted A2 signal is output as the shift output signal of the shift output signal generation circuit 800. Thus, the inverted A2 signal is only provided as the shift output signal when the A0 and A1 signals are high (logic "1").

The A2 signal provided to the second switch 850 is output by the second switch 850 to the fourth switch 870 only when the inverted A1 signal, output by the inverter 820, is high. The A2 signal is output by the fourth switch 870 only when the inverted A0 signal, output by the inverter 830, is high. Thus, the A2 signal is output as the shift output signal only when both the A0 and A1 signals are low (logic "0"). Thus, the A2 signal is output as the shift output signal when the three-bit block input is "x00" and the inverted A2 signal is output as the shift output signal when the three-bit block input is "x11," where "x" may be either a "0" or a "1." The shift output signal is thus, only high when the three-bit block input is "011" or "100."

The other three-bit block combinations, i.e. "x10" and "x01," are handled by the set of transistors 880-895. The transistors 880-895 are provided for driving the shift output signal down (i.e. logic 0) when one of the A0 or A1 signals is low and the other is high. The set of transistors 880-895 are configured as pairs of transistors provided in series wherein one of the transistors in the pair is coupled to one of the inverters 820 or 830 and the other transistor in the pair receives one of the input signals A0 or A1. Thus, for example, taking the pair of transistors 880 and 885, the transistor 880 receives as an input the inverted A0 input signal from inverter 830 while inverter 885 receives as an input the A1 input signal. Thus, if the A0 input signal is low (logic "0") and the A1 input signal is high (logic "1"), then the inputs to transistors 880 and 885 are both high thereby driving the output signal to ground and making the shift output signal a logic "0," i.e. driving the shift output signal to a low state. Similarly, if the A0 input signal is high (logic "1") and the A1 input signal is low, then the second pair of transistors 890 and 895 also drive the shift output signal low (logic "0"). As a result, the shift output signal generation circuit 800 only outputs a high (logic "1") shift output signal when the three-bit block input is "011" or "100."

Figure 9:
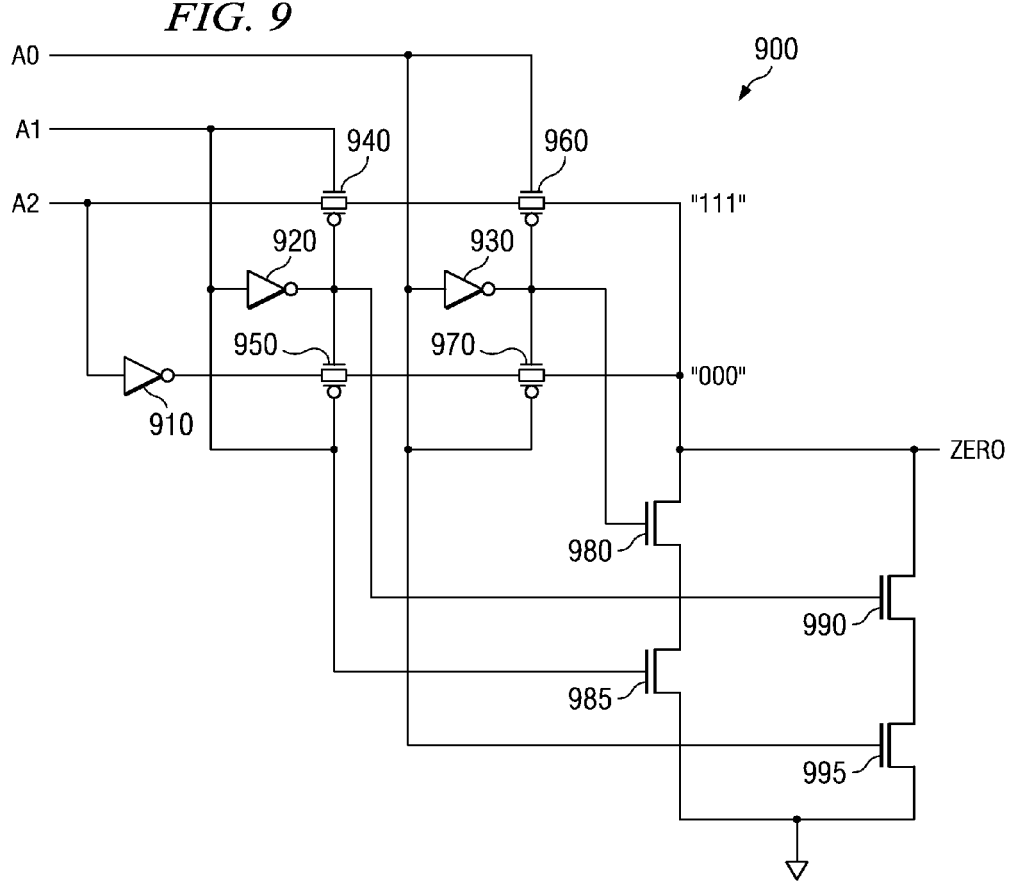
FIG. 9 is an exemplary circuit diagram of a second circuit of a Booth decoder for generating a zero control signal output in accordance with the alternative illustrative embodiment.

FIG. 9 is an exemplary circuit diagram of a second circuit of a Booth decoder for generating a zero control signal output in accordance with an illustrative embodiment. The circuitry illustrated in FIG. 9 is similar to that of FIG. 8 with the exception that the input to switch 950 is the inverted A2 input signal from inverter 910 and the input to switch 940 is the non-inverted A2 input signal.

As shown in FIG. 9, the input signal associated with the most significant bit (A2) is provided to a first switch 940 and a first inverter 910 which inverts the input signal and provides the inverted output to the second switch 950. The second switch 950 is turned on or off based on the inverted state of the input signal corresponding to the second bit (A1) of the three-bit block, as provided by the inverter 920. If the second switch 950 is turned on by the second bit (A1) being low (logic "0"), and thus, the inverted signal being high (logic "1"), then the inverted A2 signal is provided to a fourth switch 970. Otherwise, if the second switch 950 is turned off by the second bit (A1) being high (logic "1") then the inverted A2 signal is not transmitted to the fourth switch 970.

The fourth switch 970 is turned on or off based on the inverted state of the input signal corresponding to the first bit (A0) of the three-bit block, as provided by inverter 930. If the A0 input signal is low (logic "0"), then the fourth switch 970 is turned on and the inverted A2 signal is output as the zero output signal of the zero output signal generation circuit 900. Thus, the inverted A2 signal is only provided as the zero output signal when the A0 and A1 signals are low (logic "1").

The A2 signal provided to the first switch 940 is output by the first switch 940 to the third switch 960 only when the A1 signal is high. The A2 signal is output by the third switch 960 only when the A0 signal is high. Thus, the A2 signal is output as the zero output signal only when both the A0 and A1 signals are high (logic "1"). Thus, the A2 signal is output as the zero output signal when the three-bit block input is "x11" and the inverted A2 signal is output as the zero output signal when the three-bit block input is "x00," where "x" may be either a "0" or a "1." The zero output signal is thus, only high when the three-bit block input is "111" or "000."

The other three-bit block combinations, i.e. "x10" and "x01," are handled by the set of transistors 980-995. The transistors 980-995 are provided for driving the zero output signal down (i.e. logic 0) when one of the A0 or A1 signals is low and the other is high. The set of transistors 980-995 are configured as pairs of transistors provided in series wherein one of the transistors in the pair is coupled to one of the inverters 920 or 930 and the other transistor in the pair receives one of the input signals A0 or A1. Thus, for example, taking the pair of transistors 980 and 985, the transistors 980 receives as an input the inverted A0 input signal from inverter 930 while inverter 985 receives as an input the A1 input signal. Thus, if the A0 input signal is low (logic "0") and the A1 input signal is high (logic "1"), then the inputs to transistors 980 and 985 are both high thereby driving the output signal to ground and making the zero output signal a logic "0," i.e. driving the zero output signal to a low state. Similarly, if the A0 input signal is high (logic "1") and the A1 input signal is low, then the second pair of transistors 990 and 995 also drive the zero output signal low (logic "0"). As a result, the zero output signal generation circuit 900 only outputs a high (logic "1") zero output signal when the three-bit block input is "111" or "000."

Figure 10:
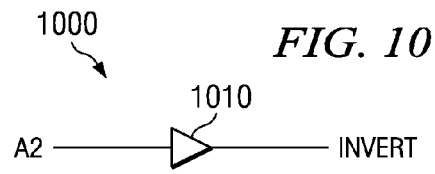
FIG. 10 is an exemplary circuit diagram of a third circuit of a Booth decoder for generating a zero control signal output in accordance with the alternative illustrative embodiment.

FIG. 10 is an exemplary circuit diagram of a third circuit of a Booth decoder for generating an invert control signal output in accordance with an illustrative embodiment. This third circuit is an invert control signal generation circuit 1000 that is comprised of a wire and an amplifier 1010. The invert control signal generation circuit 1000 receives the A2 signal as an input and passes the A2 signal as the invert control signal. Thus, if the A2 signal is high (logic "1") then the invert control signal is high. If the A2 signal is low (logic "0") then the invert control signal is low.

The combination of these three circuits provides all of the possible combinations of shift, zero, and invert control signals required to provide the necessary partial products set forth in the partial product truth table of FIG. 4B. The outputs from these three circuits, i.e. the shift, zero, and invert control signals, are provided to a Booth multiplexer which uses these signals to generate a partial product.

Figure 11:
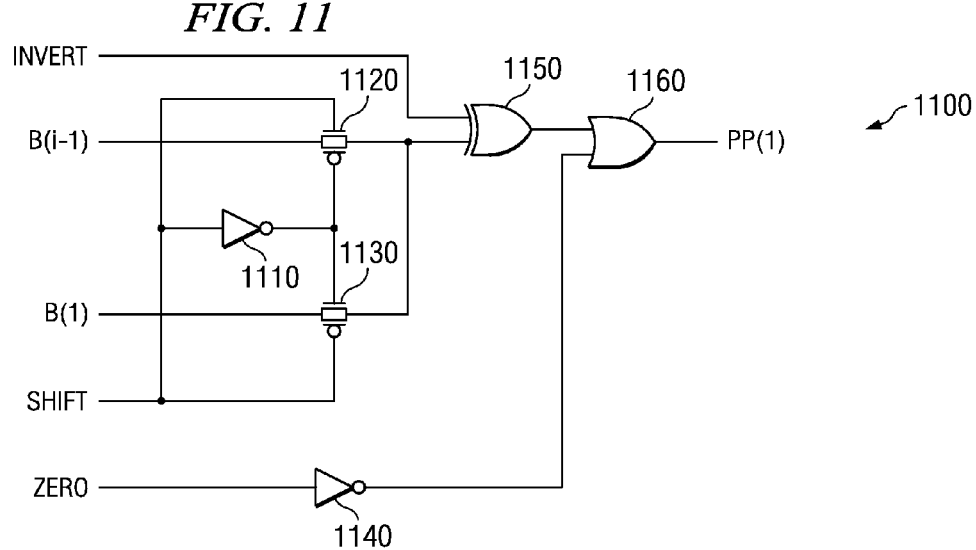
FIG. 11 is an exemplary circuit diagram of a Booth multiplexer in accordance with one illustrative embodiment.

FIG. 11 is an exemplary circuit diagram of a Booth multiplexer in accordance with one illustrative embodiment. The Booth multiplexer 1100 of FIG. 11 may be used with either of the alternative embodiments for control signal generation circuitry described previously. The Booth multiplexer 1100 receives the shift, zero, and invert control signals from the circuitry and generates the partial products for performing the Booth multiplication algorithm.

As shown in FIG. 11, the Booth multiplexer 1100 includes two inverters 1110 and 1140, two switches 1120 and 1130, an XOR gate 1150, and an AND gate 1160. The Booth decoder is uses two 2-way multiplexers. The first 2-way multiplexer, which may be comprised of the switches 1120-1130 and inverter 1110, for example, selects between 1B (1*multiplicand) and 2B (2*multiplicand) while the second 2-way multiplexer, which may be comprised of the XOR gate 1150, for example, selects a +/− value. The AND gate 1160 may be provided such that it can force the partial product to be "0" when the output from the XOR gate 1150 and the inverted zero control signal output from the inverter 1140 do not have the same state (logic "0" or logic "1"), such as when the three-bit block is "000" or "111."

With the depicted circuitry in FIG. 11, if the shift control signal input is asserted, i.e. is high (logic "1") state, then switch 1120 is turned on and switch 1130 is turned off (by way of inverter 1110). As a result, a shifted B output, i.e. 2B output, is output to the XOR gate 1150. This is denoted "B(i−1)" in FIG. 11, meaning that the B value is shifted to the left one bit and a padding "0" is added at the right end of the output.

If the shift control signal is not asserted, i.e. is low (logic "0"), then switch 1130 is turned on and switch 1120 is turned off causing a non-shifted output, or 1B, to be provided to the XOR gate 1150. This is denoted "B(i)" in FIG. 11 meaning that the output value is not shifted. For example if a binary number B(i)="0001" then 2B may be obtained by shifting "0001" to the left 1 bit and padding a "0" at the right side. The resultant binary number is "00010" and its value is 2xB.

If the invert signal input is asserted, i.e. is high (logic "1"), then a negative 1B or 2B output (depending on whether the shift signal input was asserted) is generated at the XOR gate 1150. If the invert signal input is not asserted, then a positive 1B or 2B output is generated at the XOR gate 1150.

The zero control signal input is inverted by the inverter 1140. Thus, if the zero control signal input is asserted, then the input to AND gate 1160 is a logic low which causes the AND gate 1160 to output a "0" output signal PP(i). If the zero control signal input is not asserted, then the input to AND gate 1160 is a logic high which causes the AND gate 1160 to output the input signal from XOR gate 1150 as the output signal PP(i).

As shown in FIG. 4A, the partial product outputs from the various Booth multiplexers 440-460, which may each be configured as shown in FIG. 11, may be provided to a partial product adder circuit 470 that adds the partial products together. The resulting value is the product of the multiplicand and multiplier which is provided as output of the multiplier circuit 400.

The Booth decoder circuit according to the illustrative embodiments as shown above in FIGS. 5-11 requires less circuit area and operates at a much faster speed than traditional Booth decoder circuitry, such as shown in FIGS. 2 and 3 above, which requires may complex gates. Since the circuitry of the illustrative embodiments minimizes the number of complex gates required to perform the Booth decoding, the gate delay is less than known Booth decoder mechanisms. Moreover, the circuitry of the illustrative embodiments reduce the number of transistors required and thus, the resulting power consumption is reduced as well.

The multiplier circuitry of the illustrative embodiments, which may comprise any number of Booth decoders and Booth multiplexers such as those described above with regard to FIGS. 4-11, is preferably implemented in an integrated circuit device. The multiplier circuitry, for example, may be used in a processor for performing multiplication operations.

It should be appreciated, however, that the circuitry described above may further be implemented as one or more software routines, in some illustrative embodiments, that approximate the operation of the circuits described above. Thus, not only may the illustrative embodiments be embodied in circuitry of a hardware device, such as an integrated circuit, processor, or the like, but they may also be implemented as software instructions executed by a processor.

Figure 12:
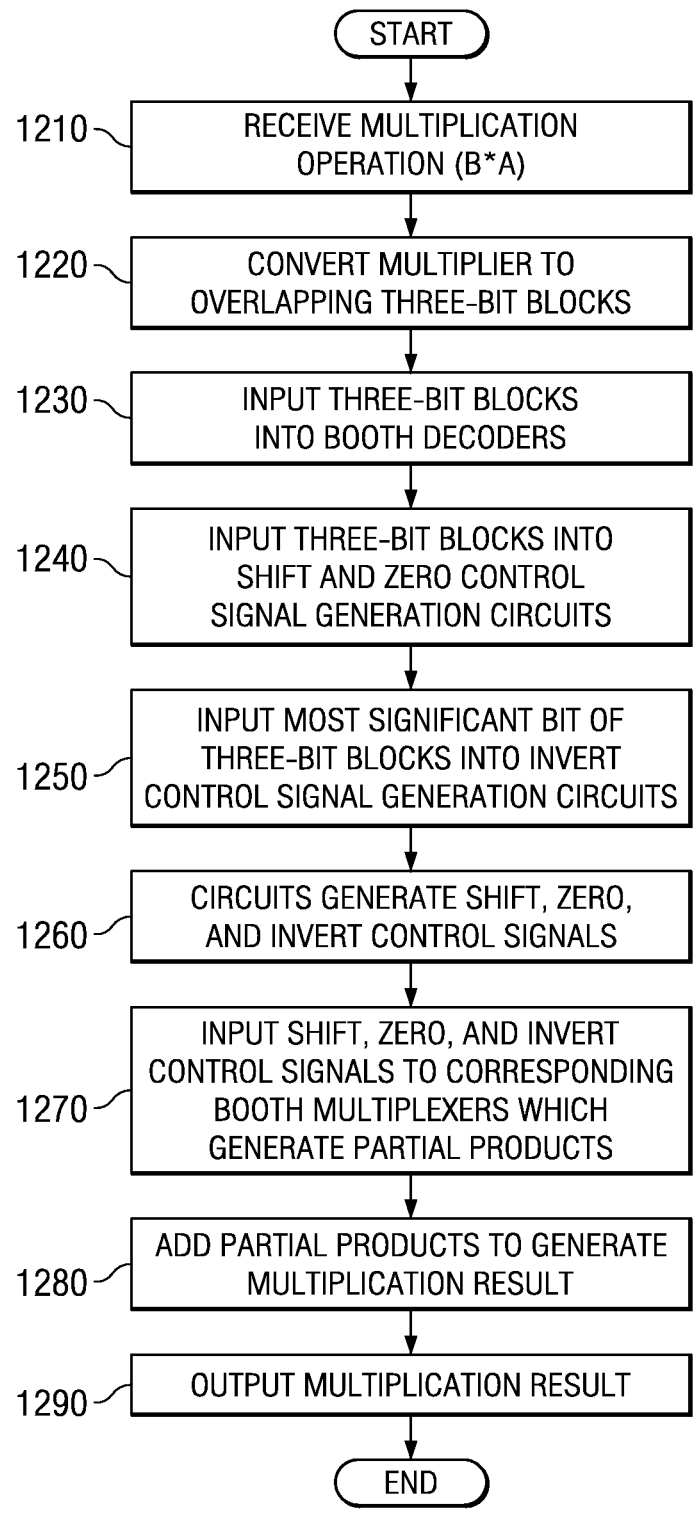
FIG. 12 is a flowchart outlining an exemplary operation of a Booth decoder in accordance with one illustrative embodiment.

FIG. 12 is a flowchart outlining an exemplary operation of a Booth decoder in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 12, the operation starts by receiving a multiplication operation for multiplying a multiplicand B by a multiplier A (step 1210). The multiplier A is converted to overlapping three-bit blocks (step 1220) which are provided to corresponding Booth decoders (1230). The three-bit blocks are input to a shift control signal generation device and a zero control signal generation device of the corresponding Booth decoders (step 1240). The most significant bits of the three-bit blocks are input to an invert control signal generation device of the corresponding Booth decoders (step 1250).

The shift control signal generation device, zero control signal generation device, and invert control signal generation device of each of the Booth decoders generate respective output control signals based on the three-bit block inputs (step 1260). The shift, zero, and invert output control signals of each of the Booth decoders are provided to corresponding Booth multiplexers which generate partial products (step 1270). The partial products are provided to a partial product adder which adds the partial products to generate the multiplication result (step 1280). The multiplication result is then output as the output of the multiplication device (step 1290). The operation then terminates.

Thus, the illustrative embodiments provide a Booth decoder circuit that reduces the number of complex gate elements and transistors required to perform Booth's multiplication algorithm. In so doing, the Booth decoder circuit reduces the area on the chip required for fabrication of the Booth decoder circuit, reduces the power consumed by the Booth decoder circuit, and increases the speed at which the Booth decoder circuit operates when compared to known Booth decoder mechanisms.

The circuit as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus, comprising:
   a shift control signal generation circuit that receives a three-bit block of a multiplier as input and generates a shift control signal;
   a zero control signal generation circuit that receives the three-bit block of the multiplier as input and generates a zero control signal; and
   an invert control signal generation circuit that receives a most significant bit of the three-bit block of the multiplier as input and generates an invert control signal, wherein the shift control signal, zero control signal, and invert control signal are output by the apparatus for controlling generation of a partial product of a Booth multiplication operation
   wherein the shift control signal generation circuit and the zero control signal generation circuit each comprise:
   a plurality of inverters;
   a plurality of switches coupled to respective ones of the plurality of inverters; and
   a set of transistors, wherein respective ones of the transistors are coupled to outputs of respective ones of plurality of inverters and the plurality of switches;
   wherein, with regard to each of the shift control signal generation circuit and the zero control signal generation circuit, a first switch of the plurality of switches is opened and closed based on a first input signal corresponding to a least significant bit of the three-bit block, a second switch of the plurality of switches is opened and closed based on a second input signal corresponding to a middle bit of the three-bit block, a third switch of the plurality of switches is opened and closed based on a third input signal corresponding to an inverted middle bit of the three-bit block and a fourth switch of the plurality of switches is opened and closed based on a fourth input signal corresponding to an inverted least significant bit of the three-bit block;
   wherein, with regard to the shift control signal generation circuit and the zero control signal generation circuit, a first transistor of the set of transistors receives an input signal corresponding to an inverted least significant bit of the three-bit block, a second transistor of the set of transistors receives an input signal corresponding to an inverted middle bit of the three-bit block, a third transistor of the set of transistors receives an input signal corresponding to the middle bit of the three-bit block, and a fourth transistor of the set of transistors receives an input signal corresponding to the least significant bit of the three-bit block, wherein the first transistor is in series with the third transistor, the second transistor is in series with the fourth transistor, the first transistor is parallel to the second transistor, and the third transistor is parallel to the fourth transistor;

wherein, with regard to the shift control signal generation circuit, the second switch receives an in up signal corresponding to an inverted most significant it of the three-bit block, the third switch receives an input signal corresponding to the most significant bit of the three-bit block, the first switch receives an output from the second switch, and the fourth switch receives an output from the third switch; and wherein, with regard to the zero control signal generation circuit, the second switch receives an input signal corresponding to the most significant bit of the three-bit block, the third switch receives an input signal corresponding to an inverted most significant bit of the three-bit block, the first switch receives an output from the second switch, and the fourth switch receives an output from the third switch.

2. The apparatus of claim 1, further comprising:
a multiplexer coupled to the shift control signal generation circuit, the zero control signal generation circuit, and the invert control signal generation circuit, wherein the multiplexer receives the shift control signal, the zero control signal, and invert control signal and generates the partial product of the Booth multiplication operation.

3. The apparatus of claim 1, wherein the shift control signal generation circuit generates a logic "1" shift control signal when the three-bit block is either "011" or "100."

4. The apparatus of claim 1, wherein the zero control signal generation circuit generates a logic "1" zero control signal when the three-bit block is either "000" or "111."

5. The apparatus of claim 1, wherein the invert control signal generation circuit generates a logic "1" invert control signal when the most significant bit of the three-bit block is a logic "1."

6. The apparatus of claim 1, wherein the set of transistors, with regard to the shift control signal generation circuit, causes the shift control signal to have a low state when the three-bit block is not "011" or "100."

7. The apparatus of claim 1, wherein the set of transistors, with regard to the zero control signal generation circuit, causes the zero control signal to have a low state when the three-bit block is not "111" or "000."

8. A method of providing a Booth decoder circuit, comprising:
providing a shift control signal generation circuit that receives a three-bit block of a multiplier as input and generates a shift control signal;
providing a zero control signal generation circuit that receives the three-bit block of the multiplier as input and generates a zero control signal; and
providing an invert control signal generation circuit that receives a most significant bit of the three-bit block of the multiplier as input and generates an invert control signal, wherein the shift control signal, zero control signal, and invert control signal are output by the Booth decoder circuit for controlling generation of a partial product of a Booth multiplication operation,
wherein the shift control signal generation circuit and the zero control signal generation circuit each comprise:

a plurality of inverters;
a plurality of switches coupled to respective ones of the plurality of inverters; and
a set of transistors, wherein respective ones of the transistors are coupled to outputs of respective ones of the plurality of inverters and the plurality of switches;
wherein, with regard to each of the shift control signal generation circuit and the zero control signal generation circuit, a first switch of the plurality of switches is our opened and closed based on a first input signal corresponding to a least significant bit of the three-bit block, a second switch of the plurality of switches is opened and closed based on a second input signal corresponding to a middle bit of the three-bit block, a third switch of the plurality of switches is opened and closed based on a third input signal corresponding to an inverted middle bit of the three-bit block, and a fourth switch of the plurality of switches is opened and closed based on a fourth input signal corresponding to an inverted least significant bit of the three-bit block;

wherein, with regard to the shift control signal generation circuit and the zero control signal generation circuit, a first transistor of the set of transistors receives an input signal corresponding to an inverted least significant bit of the three-bit block, a second transistor of the set of transistors receives an input signal corresponding to an inverted middle bit of the three-bit block, a third transistor of the set of transistors receives an input signal corresponding to the middle bit of the three-bit block, and a fourth transistor of the set of transistors receives an input signal corresponding to the least significant bit of the three-bit block, wherein the first transistor is in series with the third transistor, the second transistor is in series with the fourth transistor, the first transistor is parallel to the second transistor, and the third transistor is parallel to the fourth transistor;

wherein, with regard to the shift control signal generation circuit, the second switch receives an input signal corresponding to an most significant bit of the three-bit block, the third switch receives an input signal corresponding to the most significant bit of the three-bit block, the first switch receives an output from the second switch, and the fourth switch receives an output from the third switch; and wherein, the zero control signal generation circuit, the second switch receives an input signal corresponding to the most significant bit of the three-bit block, the third switch receives an input signal corresponding to an inverted most significant bit of the three-bit block, the first switch receives an output from the second switch, and the fourth switch receives an output from the third switch.

9. The method of claim 8, further comprising:
providing a multiplexer coupled to the shift control signal generation circuit, the zero control signal generation circuit, and the invert control signal generation circuit, wherein the multiplexer receives the shift control signal, the zero control signal, and invert control signal and generates the partial product of the Booth multiplication operation.

10. The method of claim 8, wherein the shift control signal generation circuit generates a logic "1" shift control signal when the three-bit block is either "011" or "100."

11. The method of claim 8, wherein the zero control signal generation circuit generates a logic "1" zero control signal when the three-bit block is either "000" or "111."

12. The method of claim 8, wherein the invert control signal generation circuit generates a logic "1" invert control signal when the most significant bit of the three-bit block is a logic "1."

13. The method of claim 8, wherein the set of transistors, with regard to the shift control signal generation circuit, causes the shift control signal to have a low state when the three-bit block is not "011" or "100."

14. The method of claim 8, wherein the set of transistors, with regard to the zero control signal generation circuit, causes the zero control signal to have a low state when the three-bit block is not "111" or "000."

* * * * *